(12) United States Patent
Bauer et al.

(10) Patent No.: US 6,186,300 B1
(45) Date of Patent: Feb. 13, 2001

(54) CLUTCH ASSEMBLY

(75) Inventors: Karl-Heinz Bauer, Graben-Neudorf; Jurgen Kroll, Ketsch, both of (DE)

(73) Assignee: BorgWarner Inc., Troy, MI (US)

( * ) Notice: Under 35 U.S.C. 154(b), the term of this patent shall be extended for 0 days.

(21) Appl. No.: 09/258,456

(22) Filed: Feb. 26, 1999

(30) Foreign Application Priority Data

Apr. 2, 1998 (DE) .............................................. 198 14 769

(51) Int. Cl.$^7$ ...................................................... F16D 47/00
(52) U.S. Cl. ...................... 192/48.4; 192/48.92; 192/70.3
(58) Field of Search ................... 192/99 S, 99 A, 192/99 R, 101, 100, 48.4, 48.92, 70.27, 70.3

(56) References Cited

U.S. PATENT DOCUMENTS

| 5,154,674 | 10/1992 | Avramidis et al. . |
| 5,267,910 | 12/1993 | Maruyama et al. . |

FOREIGN PATENT DOCUMENTS

| 2-073338 | * 10/1981 | (EP) | ................................. 192/48.92 |
| 443581 | 5/1912 | (FR) . | |
| 1-158226 | * 10/1987 | (JP) | ................................. 192/48.92 |
| 4-113035 | * 4/1992 | (JP) | ................................. 192/48.92 |

OTHER PUBLICATIONS

Translation of Freilaufkupplungen Berechnung und Konstruktion, Stolzle and Hart, pp. 129–132 (1961).
Freilaufkupplungen Berechnung und Konstruktion, Stolzle and Hart, pp. 129–132 (1961).

* cited by examiner

Primary Examiner—Richard M. Lorence
Assistant Examiner—Tisha D. Waddell
(74) Attorney, Agent, or Firm—Artz & Artz P.C.; Greg Dziegielewski

(57) ABSTRACT

A motor vehicle clutch assembly with an outer ring which is rotationally driven by the engine. An inner ring of the clutch assembly is seated, with a clutch element, on the transmission input shaft of a speed-change gear. The clutch element locks during engaged conditions of the engine and opens during overrun conditions of the engine.

14 Claims, 3 Drawing Sheets

CLUTCH ASSEMBLY

TECHNICAL FIELD

The present invention relates to vehicular clutch assemblies, particularly those which allow gear shifting without the use of clutch pedals.

BACKGROUND OF THE INVENTION

This invention relates to a clutch assemblies for motor vehicles. Typical clutch assemblies have outer rings which are rotationally driven by the vehicle engine, inner rings in torque-transmitting linkage with the transmission input shaft of a speed-change gear, and at least one clutch plate or friction disc (lamella) provided on an outer ring and/or on an inner ring, which engages frictionally and withdraws under increasing slip.

Clutch assemblies are common in motor vehicles with manual transmissions. The clutch is operated by the driver through a clutch pedal when the vehicle is to accelerate from rest or when gears are to be shifted and changed.

Synchronized manual transmissions utilize synchronization mechanisms that adjust the gear speed to the engine speed when gears are being shifted and changed. These synchronization mechanisms fulfill their function only when the transmission input shaft is torque-free, which is why the clutch must be operated to shift gears in conventional systems.

Automatic transmissions torque converters have not met with universal acceptance for motor vehicles. They result in added manufacturing costs, loss of propulsion power, and added fuel consumption, which purchasers of small to medium-sized cars, in particular, are not always willing to accept.

Added fuel consumption, from an ecological point of view, also means increased exhaust emissions. Again, this is undesirable.

Driver's attitudes regarding automatic transmissions are also affected by psychological factors. Some drivers consider the manual shifting of gears sportive and like to be in direct control of their vehicle. Many drivers also attach importance to being able to tow their cars themselves, without lifting the vehicle's driving axle off the ground.

Semi-automatic transmissions are known for motor vehicles, which allow the driver of a vehicle to shift gears without operating the clutch. According to the current state of the art, however, these transmissions require extensive sensor and actuator technologies. The transmissions are accordingly complex, and at times sluggish in their shifting behavior.

A drivetrain design that is widely used in international vehicle manufacturing has a clutch assembly positioned between the engine and a manually operated synchronized speed-change gear on the transmission input shaft of the latter. It is the aim of the present invention to automate the function of such a clutch assembly so that it is required only as a startup clutch, but not needed for gear changes, while maintaining the benefits and attributes of the above design to the largest extent possible.

SUMMARY OF THE INVENTION

The above object is met with a clutch assembly of the type described herein, in which the inner ring of the clutch assembly is seated on the transmission input shaft with a clutch mechanism which locks during engaged conditions of the engine and opens during overrun conditions of the engine.

With the clutch mechanism according to the present invention, the transmission input shaft is rendered torque-free by reducing the engine drive torque during overrun conditions of the engine. The gears may then be shifted without operating the clutch. When the engine torque is reactivated, the clutch element reestablishes the torque-transmitting connection with the speed-change gear during the engaged condition of the engine.

The clutch element may be shifted by auxiliary means, specifically electromagnetically. A clutch element with automated shifting, preferably in the form of a free-wheel mechanism, may also be used.

Arranging a free-wheel mechanism between the engine and the speed-change gear of a vehicle is known. The technical book "*Freilaujkupplungen Berechnung und Konstruktion*" by Messrs. Dipl.-Ing. Karl Stoelzle Dipl.-Ing. Sigwalt Hart, which appeared in the series "*Konstruktionsbuecher*" edited by Professor Dr. Ing. K. Kollmann, Karlsruhe, published by Springer Verlag, 1961, describes this system on pages 129 to 132 for the Auto Union DKW, which had a two-stroke engine. This engine was only conditionally suited for braking with the engine during overrun conditions and was therefore decoupled by the free-wheel mechanism. In principle it was thus made possible to shift in the synchronized gears without having to step on the clutch.

A special characteristic of the present invention, in contrast, is that the inner ring of the clutch assembly is seated, with the free-wheel mechanism, directly on the transmission input shaft. This means that the free-wheel mechanism is integrated into the inner clutch ring. This configuration makes it possible to maintain the design of the drivetrain that is widely used in international vehicle manufacturing, and to modify the clutch assembly as an add-on component without requiring any additional axial construction length, with the result that the clutch is used as a startup clutch, but not required to shift gears.

In one embodiment of the present invention, it is not possible to brake with the engine, as the free-wheel mechanism opens during overrun conditions. However, to allow braking with the engine in certain driving situations, e.g., during extended down-hill driving, preferred improvements of the invention additionally provide for either a free-wheel mechanism that is made blockable, or a special overrun clutch for a torque-transmitting linkage of the engine to the transmission input shaft.

According to the above technical reference, the free-wheel mechanism of the Auto-Union DKW system could be blocked at a synchronized torque of the engine and transmission, to allow braking with the engine during overrun conditions. The preferred special clutch according to the invention, in contrast, is characterized by an improved operability and smoother action.

In a first embodiment of the invention, the overrun clutch has clutch lamellas (friction disc or clutch plate) arranged on the outer ring of the clutch assembly and on an inner ring of the overrun clutch. The inner ring of the overrun clutch is positioned on the transmission input shaft with a free-wheel mechanism, which opens during engaged conditions of the engine and closes during overrun conditions of the engine.

In an alternative embodiment of the invention, the overrun clutch has friction discs positioned at a friction disc or clutch plate of the overrun clutch and the transmission input shaft, bridging the free-wheel mechanism of the clutch assembly.

The clutch assembly and the overrun clutch can be operated independently, e.g., by means of two operating levers. However, the operation of the overrun clutch is preferably derived from that of the clutch assembly in a manner such that a disengagement of the clutch results in an engagement of the overrun clutch and an engagement of the clutch results in a disengagement of the overrun clutch. This type of clutch operation is characterized by simple actuator technology. The engagement of the overrun clutch preferably takes place at the beginning of the displacement lift for the disengagement of the clutch assembly.

Because of the complex function of the disengagement mechanism, a complete automation of the clutch is also preferable for its function as a startup clutch.

The clutch assembly may either be dry-running or wet-running.

DESCRIPTION OF THE PREFERRED EMBODIMENT(S)

The drive engine has a rotationally driven flywheel 10. The drive torque of the engine is transmitted to the transmission input shaft 12 of a speed-change gear via the clutch assembly 8.

Figure 1:
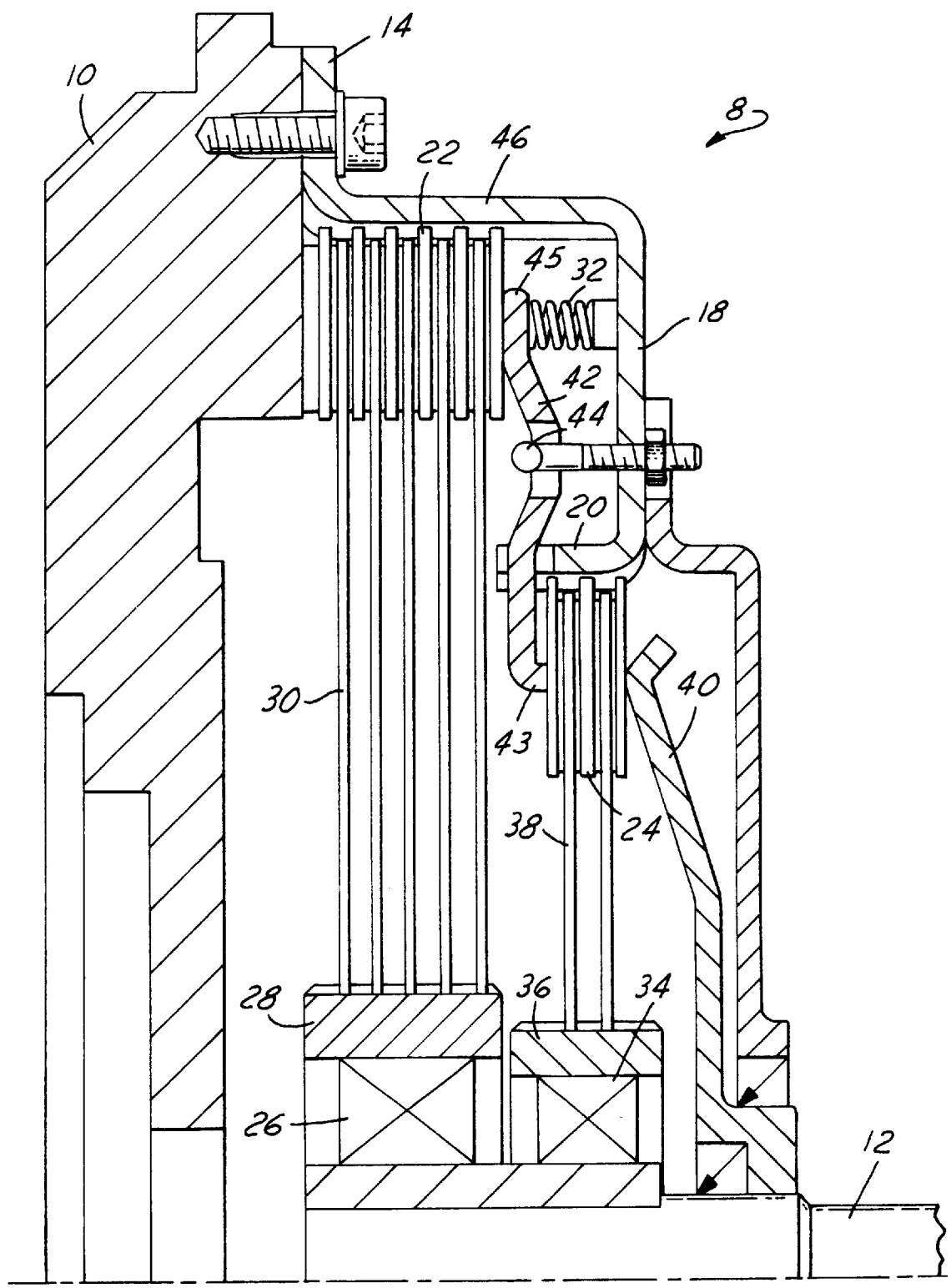
FIG. 1 is a cross-sectional view of one-half of a first clutch assembly.

As shown in FIG. 1, the flywheel 10 of the clutch assembly 8 has an outer clutch ring comprising an outer mounting flange member 14, an outer jacket ring member 16, a front plate member 18 and an inner jacket ring member 20 which is bent inwards. The outer jacket ring member 16 and the inner jacket ring member 20 each have steel lamellas (friction discs or clutch plates) 22, 24, radially projecting to the inside.

Seated on the engine side of the transmission input shaft 12, with a free-wheel mechanism 26, is an inner clutch ring member 28. The ring member 28 friction discs (or disc layers) 30 radially projecting to the outside which are in comb-like interaction with the steel friction discs 22 of the outer jacket ring member 16. The friction discs 22, 30 are pretensioned with coupling springs 32, to produce a frictional engagement.

The free-wheel mechanism 26 of the clutch assembly—the main clutch—is designed so that it locks during engaged conditions of the engine and opens during overrun conditions of the engine.

Seated on the gear side of the transmission input shaft 12, with a free-wheel mechanism 34, is an inner overrun-clutch ring member 36. The inner ring member 36 has friction discs or disc layers 38 radially projecting to the outside, which are in comb-like interaction with the steel friction discs or disc layers 24 of the inner jacket ring member 20. The free-wheel mechanism 34 of the overrun clutch is designed so that it opens during engaged conditions of the engine and closes during overrun conditions of the engine.

The main clutch and the overrun clutch are actuated via an actuator 40 positioned on the gear side, which axially retracts into the clutch housing. The actuator 40 acts on the friction discs 24, 38 of the overrun clutch to move them into a frictionally engaged position.

Positioned between the friction discs 22, 30, 24, 38 of the main clutch or the overrun clutch, respectively, are two-armed deflection levers 42, which are pivoted around a radial center axis 44. The inner end 43 of the deflection levers 42 is supported on the back side of the overrun clutch friction discs 24, 38 facing away from the actuator 40. The outer end 45 of the deflection levers 42 is in contact with the lamellas 22, 30 of the main clutch and is actuated by the clutch springs 32.

Because of the deflection levers 42, the engagement of the overrun clutch results in a disengagement of the main clutch against the force of the clutch springs 32.

Figure 2:
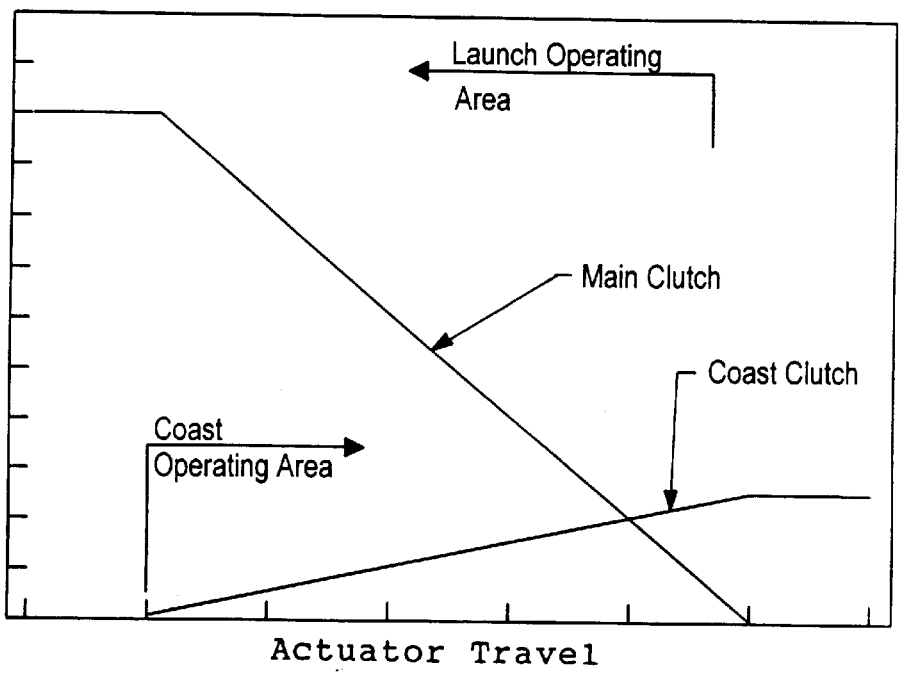
FIG. 2 depicts an associated torque capacity diagram of the clutch assembly of FIG. 1.

FIG. 2 shows the torque capacity of the main clutch and the overrun clutch of FIG. 1 in dependence on the operation path. A high torque capacity means that the clutch is engaged and a torque can be transmitted via the clutch. A torque capacity of zero means that the clutch is disengaged and no torque can be transmitted via the clutch.

Figure 4:
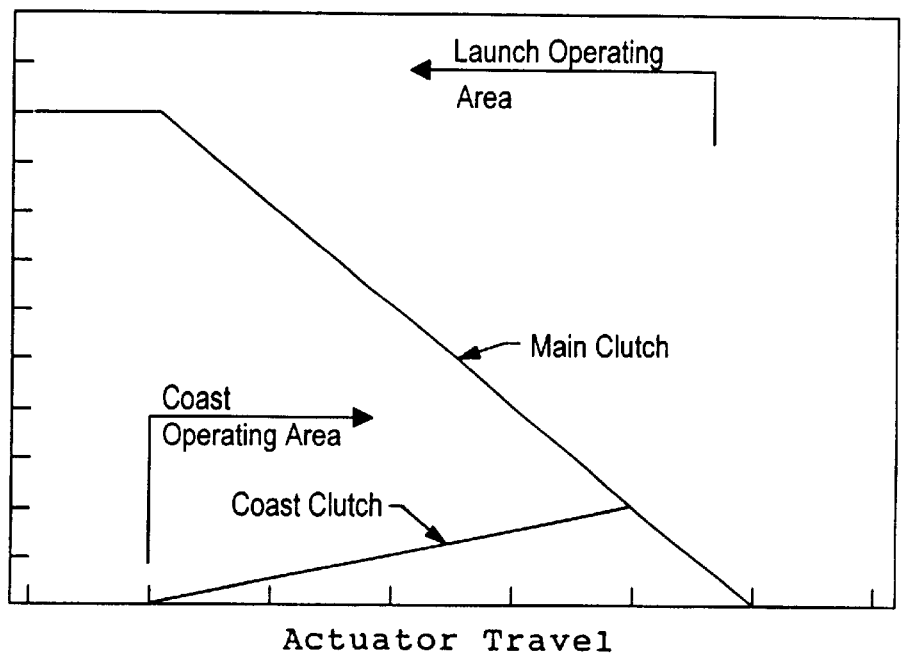
FIG. 4 shows a torque capacity diagram associated with the clutch assembly shown in FIG. 3.
Figure 3:
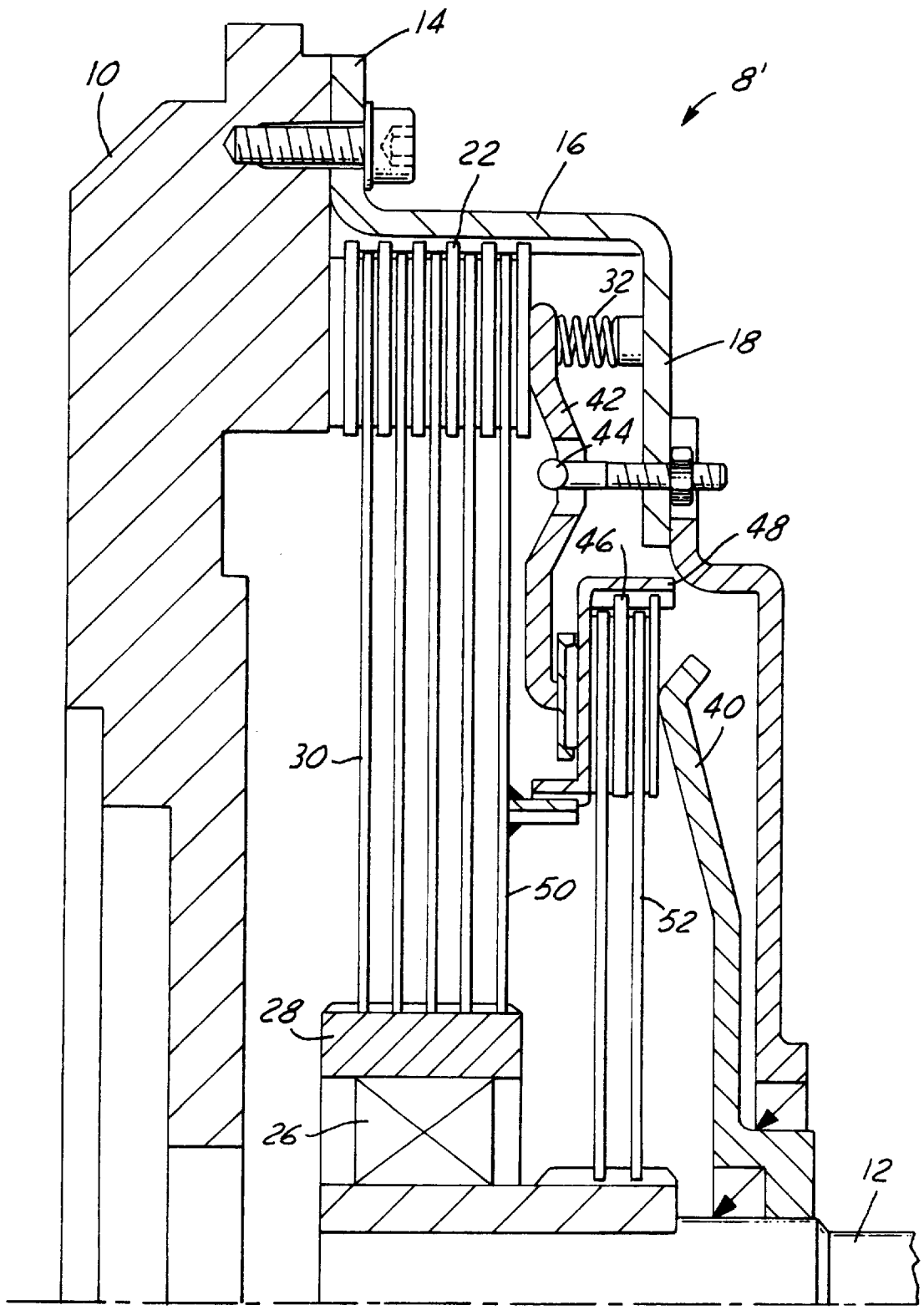
FIG. 3 is a cross-sectional view of one-half of a second clutch assembly.

The clutch assembly 8', as shown in FIG. 3, has an outer overrun-clutch ring 48 with steel lamellas or friction disc layers 46, placed on the foremost friction disc 50 of the main clutch, on the gear side. The friction discs 52 of the overrun clutch are seated directly on the transmission input shaft 12. According to the respective torque capacity diagram in FIG. 4, the overrun clutch bridges the free-wheel mechanism 26 of the main clutch during disengagement of the main clutch across part of the operating path. The overrun clutch transfers, at the most, as much torque as the main clutch.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. A clutch assembly for motor vehicles, said clutch assembly comprising:
a first outer ring rotationally driven by a vehicle engine, a first inner ring in torque-transmitting linkage with the transmission input shaft of a speed-change gear, and at least one friction member provided on said first outer ring and/or on said first inner ring, which engages frictionally and withdraws under increasing slip, wherein said first inner ring is seated on the transmission shaft with a first clutch element which locks during engaged conditions of the engine and opens during overrun conditions of the engine; and a second outer ring rotationally driven by the vehicle engine, a second inner ring in torque-transmitting linkage with the transmission input shaft, and at least one friction member provided on said second outer ring and/or second inner ring, said second inner ring being seated on the transmission shaft with a second clutch element which opens during engaged conditions of the engine and closes during overrun conditions of the engine.

2. A clutch assembly according to claim 1 wherein said clutch element is externally shifted.

3. A clutch assembly according to claim 1 wherein said clutch element shifts automatically.

4. A clutch assembly according to claim 3 wherein said clutch element is a free-wheel mechanism.

5. A clutch assembly according to claim 4 wherein said free-wheel mechanism can be blocked.

6. The clutch assembly according to claim 1 further comprising friction members which are seated at the clutch assembly and the transmission input shaft, and bridge the second clutch element of the clutch assembly.

7. The clutch assembly according to claim 1, wherein said first outer ring and first inner ring can be operated independently of said second outer ring and second inner ring.

8. The clutch assembly according to claim 1, wherein said clutch assembly is operated by a clutch mechanism and wherein engagement of said clutch mechanism results in disengagement of said second outer ring and second inner ring and disengagement of said clutch mechanism results in engagement of said second outer ring and second inner ring.

9. A clutch assembly according to claim 1, wherein said clutch assembly is dry-running.

10. A clutch assembly according to claim 1, wherein said clutch assembly is wet running.

11. A clutch assembly for motor vehicles having an engine, transmission, transmission input shaft and an engaging clutch mechanism, said clutch assembly comprising:

a first friction clutch mechanism in torque-transmitting linkage to the transmission input shaft, and having friction members and a first clutch element, said first clutch element locking during engaged conditions of the engine and opening during overrun conditions of the engine; and an overrun friction mechanism in torque-transmitting linkage to the transmission input shaft and having friction members and a second clutch element, said second clutch element opening during engaged conditions of the engine and closing during overrun conditions of the engine.

12. The clutch assembly as recited in claim 11 wherein said friction members of said overrun friction clutch mechanism bridge the second clutch element.

13. The clutch assembly as recited in claim 11 wherein said first friction clutch mechanism and said overrun friction clutch mechanism can be operated independently of one another.

14. The clutch assembly as recited in claim 11 wherein disengagement of said engaging clutch mechanism results in engagement of said overrun friction clutch mechanism, and engagement of said engaging clutch mechanism results in disengagement of said overrun friction clutch mechanism.

* * * * *